United States Patent
Ash et al.

[11] Patent Number: 5,940,201
[45] Date of Patent: Aug. 17, 1999

[54] ELECTROCHROMIC MIRROR WITH TWO THIN GLASS ELEMENTS AND A GELLED ELECTROCHROMIC MEDIUM

[75] Inventors: Kevin L. Ash, Grand Rapids; William L. Tonar; Frederick T. Bauer, both of Holland, all of Mich.

[73] Assignee: Gentex Corporation, Zeeland, Mich.

[21] Appl. No.: 08/834,783

[22] Filed: Apr. 2, 1997

[51] Int. Cl.⁶ .................................................. G02F 1/153
[52] U.S. Cl. ........................... 359/267; 359/270; 359/273
[58] Field of Search ................................... 359/267, 270, 359/273

[56] References Cited

U.S. PATENT DOCUMENTS 5,145,609  9/1992  Varaprasad et al. ................... 252/583

FOREIGN PATENT DOCUMENTS

0612826 A1  8/1994  European Pat. Off. .......... C09K 9/02
WO 95/30495  11/1995  WIPO .............................. B05D 5/06
WO 96/03475  2/1996  WIPO .............................. C09K 9/02

*Primary Examiner*—Georgia Epps
*Assistant Examiner*—Dawn-Marie Bey
*Attorney, Agent, or Firm*—Brian J. Rees

[57] ABSTRACT

An improved electrochromic rearview mirror for motor vehicles, the mirror incorporating thin front and rear spaced glass elements having a thickness ranging from about 0.5 to about 1.5. A layer of transparent conductive material is placed onto the mirror's second surface, and either another layer of transparent conductive material or a combined reflector/electrode is placed onto the mirror's third surface. A chamber, defined by the layers on the interior surfaces of the front and rear glass elements and a peripheral sealing member, contains a free-standing gel comprising a solvent and a crosslinked polymer matrix. The chamber further contains at least one electrochromic material in solution with the solvent and interspersed in the crosslinked polymer matrix. The gel cooperatively interacts with the thin glass elements to form a thick, strong unitary member which is resistant to flexing, warping, bowing and/or shattering and further allows the mirror to exhibit reduced vibrational distortion and double imaging.

29 Claims, 2 Drawing Sheets

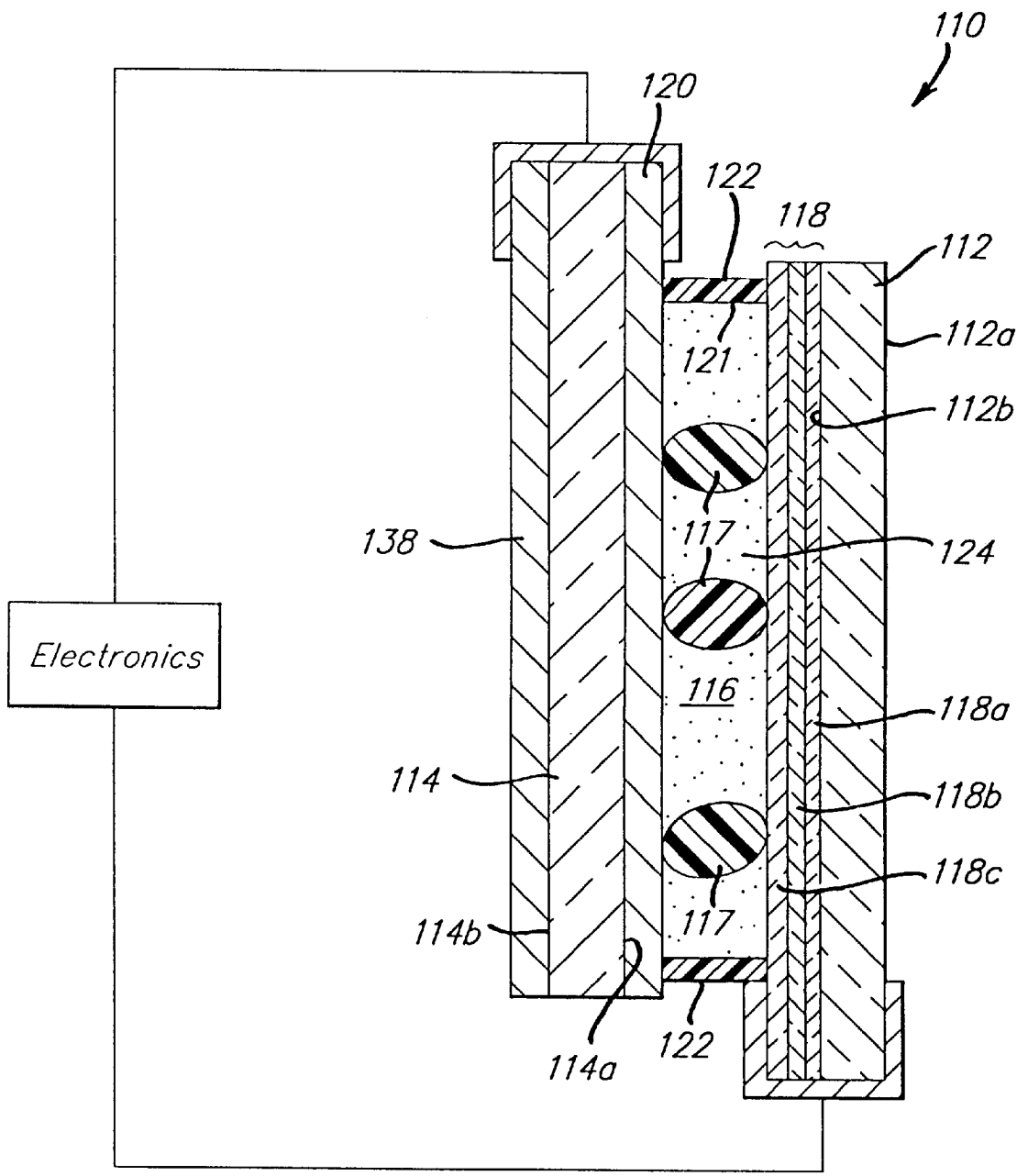

ELECTROCHROMIC MIRROR WITH TWO THIN GLASS ELEMENTS AND A GELLED ELECTROCHROMIC MEDIUM

BACKGROUND OF THE INVENTION

This invention relates to an improved electrochromic mirror having two thin glass elements and a free-standing gel and, more particularly, a lightweight electrochromic mirror having a free-standing gel that cooperatively interacts with two thin glass elements to form a thick, strong unitary member which is resistant to flexing, warping, bowing, shattering and/or scattering.

Heretofore, various automatic rearview mirrors for motor vehicles have been devised which automatically change from the full reflectance mode (day) to the partial reflectance mode(s) (night) for glare protection purposes from light emanating from the headlights of vehicles approaching from the rear. The electrochromic mirrors disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al., each of which patents is assigned to the assignee of the present invention and the disclosures of each of which are hereby incorporated herein by reference, are typical of modern day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in the above referenced U.S. Patents, both the inside and the outside rearview mirrors are comprised of a relatively thin electrochromic medium sandwiched and sealed between two glass elements.

In most cases, when the electrochromic medium which functions as the media of variable transmittance in the mirrors is electrically energized, it darkens and begins to absorb light, and the more light the electrochromic medium absorbs the darker or lower in reflectance the mirror becomes. When the electrical voltage is decreased to zero, the mirror returns to its clear high reflectance state. In general, the electrochromic medium sandwiched and sealed between the two glass elements is comprised of solution-phase, self-erasing system of electrochromic materials, although other electrochromic media may be utilized, including an approach wherein a tungsten oxide electrochromic layer is coated on one electrode with a solution containing a redox active material to provide the counter electrode reaction. When operated automatically, the rearview mirrors of the indicated character generally incorporate light-sensing electronic circuitry which is effective to change the mirrors to the dimmed reflectance modes when glare is detected, the sandwiched electrochromic medium being activated and the mirror being dimmed in proportion to the amount of glare that is detected. As glare subsides, the mirror automatically returns to its normal high reflectance state without any action being required on the part of the driver of the vehicle.

The electrochromic medium is disposed in a sealed chamber defined by a transparent front glass element, a peripheral edge seal, and a rear mirror element having a reflective layer, the electrochromic medium filling the chamber. Conductive layers are provided on the inside of the front and rear glass elements, the conductive layer on the front glass element being transparent while the conductive layer on the rear glass element may be transparent or the conductive layer on the rear glass element may be semi-transparent or opaque and may also have reflective characteristics and function as the reflective layer for the mirror assembly. The conductive layers on both the front glass element and the rear glass element are connected to electronic circuitry which is effective to electrically energize the electrochromic medium to switch the mirror to nighttime, decreased reflectance modes when glare is detected and thereafter allow the mirror to return to the daytime, high reflectance mode when the glare subsides as described in detail in the aforementioned U.S. Patents. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface.

Recently, electrochromic mirrors have become common on the outside of vehicles, and suffer from the fact that they are significantly heavier than standard outside mirrors. This increased weight with electrochromic mirrors exerts a strain on the mechanisms used to automatically adjust the position of the outside mirrors. One method of decreasing the weight of an electrochromic mirror is by reducing the thickness of both glass elements or even remove one glass plate. For example, in solid state electrochromic devices, such as those described in U.S. Pat. No 4,973,141 to Baucke et al., where all the components comprise solid state elements, e.g., solid state electrochromic layers ($WO_3$ and $MoO_3$), solid, hydrogen ion-conducting layers, etc., it has been proposed that the back plate is optional. This is possible because the other layers are all in the solid phase and remain attached to the front plate. In electrochromic devices containing at least one solution-phase electrochromic material on the other hand, it is not possible to remove one glass plate because the solvent and electrochromic material would leak out. Therefore, the only option for electrochromic devices containing a solution is to decrease the glass thickness. Unfortunately, as the thickness is decreased the individual glass elements become fragile and flexible and remain that way during and after the manufacture of an electrochromic mirror. This is especially true as the mirrors become larger such as is needed on vehicles like sport-utility vehicles and very large trucks, e.g., tractor-trailers. It is therefore difficult to produce a commercially desirable electrochromic mirror containing at least one solution-phase electrochromic material that has two thin glass elements because each thin glass element will be much more likely to flex, warp, bow and/or shatter. Properties of a solution-phase electrochromic device, such as coloring and clearing times and optical density when colored, are dependent on the thickness of the electrochromic layer (e.g., the spacing between the two glass elements). Maintaining uniform spacing is necessary to maintain uniform appearance. The spacing between thin glass elements can be easily changed even after device manufacture by applying subtle pressure on one of the glass plates. This creates an undesirable non-uniformity in the appearance of the device.

Consequently, it is desirable to provide an improved electrochromic mirror having a free-standing gel containing at least one solution-phase electrochromic material, where the gel cooperatively interacts with two thin glass elements to form a thick strong unitary member which is resistant to flexing, warping, bowing, shattering and/or scattering and helps maintain uniform spacing between the thin glass elements.

OBJECTS OF THE INVENTION

Accordingly, a primary object of the present invention is to provide a lightweight electrochromic mirror having a free-standing gel containing at least one solution-phase electrochromic material, where the gel cooperatively interacts with two thin glass elements to form a thick, strong unitary member which is resistant to flexing, warping, bowing, shattering and/or scattering.

Another object of the present invention is to provide a lightweight electrochromic mirror having two thin glass elements that exhibits reduced vibration, distortion and double imaging.

SUMMARY OF THE INVENTION

The above and other objects, which will become apparent from the specification as a whole, including the drawings, are accomplished in accordance with the present invention by providing an electrochromic mirror with thin front and rear spaced glass elements. A layer of transparent conductive material is placed onto the second surface, and either another layer of transparent conductive material or a combined reflector/electrode is placed onto the third surface. A chamber is defined by the layers on the interior surfaces of the front and rear glass elements and a peripheral sealing member. In accordance with the present invention, the chamber contains a free-standing gel comprising a solvent and a crosslinked polymer matrix, and further contains at least one electrochromic material in solution with the solvent and interspersed in the crosslinked polymer matrix, where the gel cooperatively interacts with the thin glass elements to form a thick, strong unitary member which is resistant to flexing, warping, bowing, shattering and/or scattering, and further allows the mirror to exhibit reduced vibration, distortion and double imaging.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 2 is an enlarged cross-sectional view of the inside electrochromic rearview mirror incorporating a free-standing gel cooperatively interacting with two thin glass elements illustrated in FIG. 1, taken on the line 2–2' thereof.

DETAILED DESCRIPTION

Figure 1:
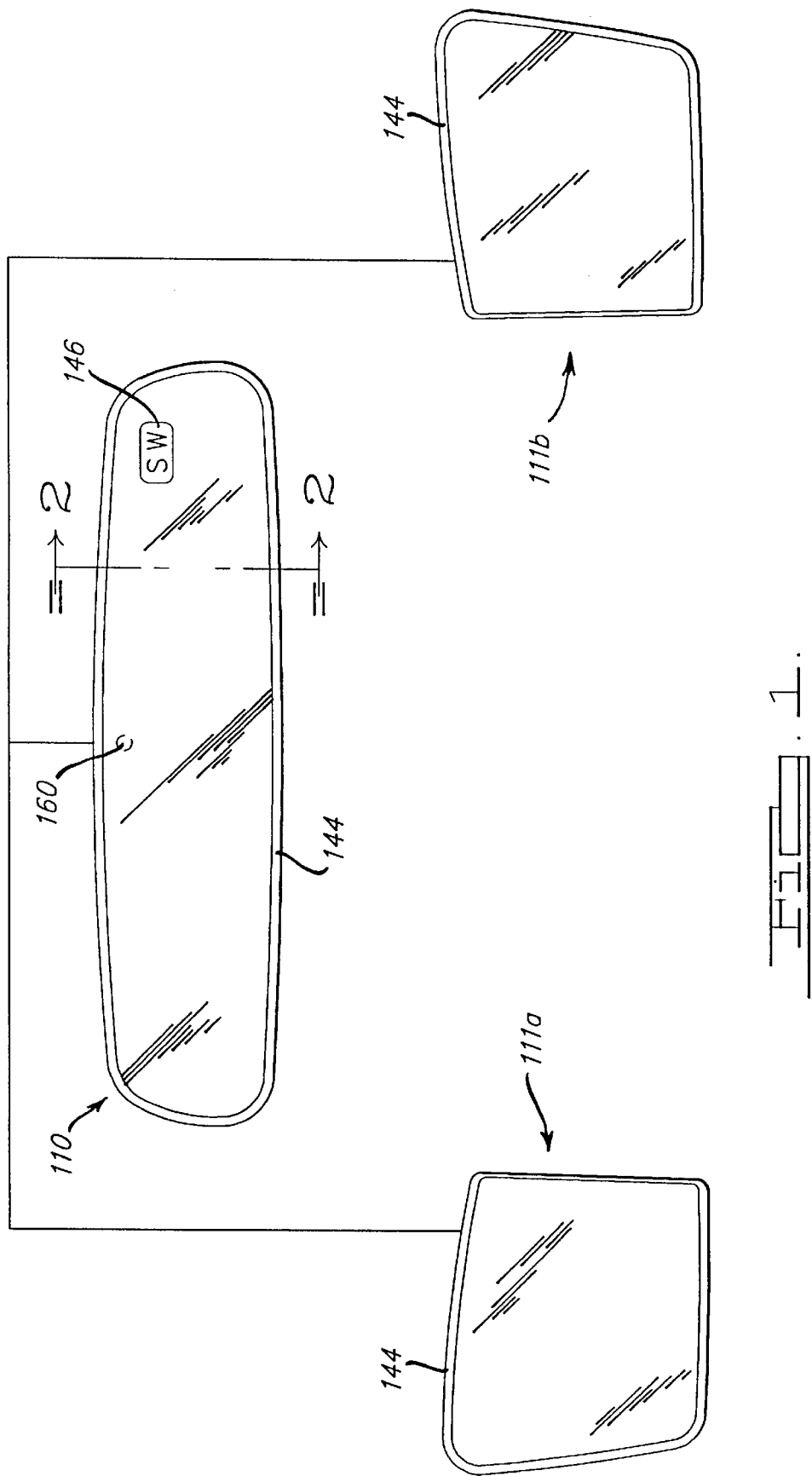
FIG. 1 is a front elevational view schematically illustrating an inside/outside electrochromic rearview mirror system for motor vehicles where the inside and outside mirrors incorporate the mirror assembly of the present invention.

FIG. 1 shows a front elevational view schematically illustrating an inside mirror assembly 110 and two outside rearview mirror assemblies 111*a* and 111*b* for the driver-side and passenger-side, respectively, all of which are adapted to be installed on a motor vehicle in a conventional manner and where the mirrors face the rear of the vehicle and can be viewed by the driver of the vehicle to provide a rearward view. Inside mirror assembly 110, and outside rearview mirror assemblies 111*a* and 111*b* may incorporate light-sensing electronic circuitry of the type illustrated and described in the above-referenced Canadian Patent No. 1,300,945; U.S. Pat. No. 5,204,778; or U.S. Pat. No. 5,451,822, and other circuits capable of sensing glare and ambient light and supplying a drive voltage to the electrochromic element. Mirror assemblies 110, 111*a* and 111*b* are essentially identical in that like numbers identify components of the inside and outside mirrors. These components may be slightly different in configuration but function in substantially the same manner and obtain substantially the same results as similarly numbered components. For example, the shape of the front glass element of inside mirror 110 is generally longer and narrower than outside mirrors 111*a* and 111*b*. There are also some different performance standards placed on inside mirror 110 compared with outside mirrors 111*a* and 111*b*. For example, inside mirror 110 generally, when fully cleared, should have a reflectance value of about 70 percent to about 80 percent or higher whereas the outside mirrors often have a reflectance of about 50 percent to about 65 percent. Also, in the United States (as supplied by the automobile manufacturers), the passenger-side mirror 111*b* typically has a spherically bent, or convex shape, whereas the driver-side mirror 111*a*, and inside mirror 110 presently must be flat. In Europe the driver-side mirror 111*a* is commonly flat or aspheric, whereas the passenger-side mirror 111*b* has a convex shape. In Japan both mirrors have a convex shape. The following description is generally applicable to all mirror assemblies of the present invention.

Rearview mirrors embodying the present invention preferably include a bezel 144, which extends around the entire periphery of each individual assembly 110, 111*a* and/or 111*b*. The bezel 144 conceals and protects the spring clips (not shown) and the peripheral edge portions of sealing member and both the front and rear glass elements (described below). A wide variety of bezel designs are well known in the art, such as, for example the bezel taught and claimed in above-referenced U.S. Pat. No. 5,448,397. There are also a wide variety of housing well known in the art for attaching the mirror assembly 110 to the inside front windshield of an automobile, or for attaching the mirror assemblies 111*a* and 111*b* to the outside of an automobile. A preferred housing for attaching an inside assembly is disclosed in above-referenced U.S. Pat. No. 5,337,948.

The electrical circuit preferably incorporates an ambient light sensor (not shown) and a glare light sensor 160, the glare light sensor being positioned either behind the mirror glass and looking through a section of the mirror with the reflective material completely or partially removed, or the glare light sensor can be positioned outside the reflective surfaces, e.g., in the bezel 144. Additionally, an area or areas of the electrode and reflector, such as 146 or the area aligned with sensor 160, may be completely removed, or partially removed in, for example, a dot or line pattern, to permit a vacuum fluorescent display, such as a compass, clock, or other indicia, to show through to the driver of the vehicle. Co-filed U.S. Patent Application entitled "AN INFORMATION DISPLAY AREA ON ELECTROCHROMIC MIRRORS HAVING A THIRD SURFACE REFLECTOR" shows a presently preferred line pattern. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system.

FIG. 2 shows a cross-sectional view of mirror assembly 110 along the line 2–2'. Mirror 110 has a front transparent element 112 having a front surface 112a and a rear surface 112b, and a rear element 114 having a front surface 114a and a rear surface 114b. Since some of the layers of the mirror are very thin, the scale has been distorted for pictorial clarity. Also, for clarity of description of such a structure, the following designations will be used hereinafter. The front surface of the front glass element will be referred to as the first surface and the back surface of the front glass element as the second surface. The front surface of the rear glass element will be referred to as the third surface, and the back surface of the rear glass element as the fourth surface. Chamber 116 is defined by one or more layers of transparent conductive material 118 (disposed on front element rear surface 112b), another layer disposed on rear element front surface 114a comprising either a transparent conductive material 120 or a combination reflector/electrode, and an inner circumferential wall 121 of sealing member 122. Typically electrochromic mirrors are made with glass elements having a thickness of about 2.3 mm. The preferred thin glass elements according to the present invention have thicknesses of about 1.0 mm, which results in a weight savings of more than 50%. This decreased weight ensures that the mechanisms used to manipulate the orientation of the mirror, commonly referred to as carrier plates, are not overloaded and further provides significant improvement in the vibrational stability of the mirror.

Front transparent element 112 may be any material which is thin and transparent and has sufficient strength to be able to operate in the conditions, e.g., varying temperatures and pressures, commonly found in the automotive environment. Front element 112 may comprise any type of glass, borosilicate glass, soda lime glass, float glass or any other material, such as, for example, a polymer or plastic, that is transparent in the visible region of the electromagnetic spectrum. Front element 112 is preferably a sheet of glass with a thickness ranging from 0.5 mm to about 1.5 mm. More preferably front element 112 has a thickness ranging from about 0.8 mm to about 1.2 mm, with the presently most preferred thickness about 1.0 mm. Rear element 114 must meet the operational conditions outlined above, except that it does not need to be transparent, and therefore may comprise polymers, metals, glass, ceramics, and preferably is a sheet of glass with a thickness in the same ranges as element 112.

When both glass elements are made thin the vibrational properties of an interior or exterior mirror improve—although the effects are more significant for exterior mirrors. These vibrations, that result from the engine running and/or the vehicle moving, affect the rearview mirror, such that the mirror essentially acts as a weight on the end of a vibrating cantilever beam. This vibrating mirror causes blurring of the reflected image that is a safety concern as well as a phenomenon that is displeasing to the driver. As the weight on the end of the cantilever beam (i.e., the mirror element attached to the carrier plate on the outside mirror or the mirror mount on the inside mirror) is decreased the frequency at which the mirror vibrates increases. If the frequency of the mirror vibration increases to around 60 Hertz the blurring of the reflected image is not visually displeasing to the vehicle occupants. Moreover, as the frequency at which the mirror vibrates increases the distance the mirror travels while vibrating decreases significantly. Thus, by decreasing the weight of the mirror element the complete mirror becomes more vibrationally stable and improves the ability of the driver to view what is behind the vehicle. For example, an interior mirror with two glass elements having a thickness of 1.1 mm has a first mode horizontal frequency of about 55 Hertz whereas a mirror with two glass elements of 2.3 mm has a first mode horizontal frequency of about 45 Hertz. This 10 Hertz differences produces a significant improvement in how a driver views a reflected image.

No electrochromic mirrors incorporating two thin glass elements and containing a solution-phase electrochromic material have been commercially available because thin glass suffers from being flexible and therefore is prone to warping, flexing and bowing, especially when exposed to extreme environments. Thus, in accordance with the present invention, chamber 116 contains a free-standing gel that cooperatively interacts with thin glass elements 112 and 114 to produce a mirror that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium" 124). This allows one to construct a rearview mirror with thinner glass in order to decrease the overall weight of the mirror while maintaining sufficient structural integrity so that the mirror will survive the extreme conditions common to the automobile environment. This also helps maintain uniform spacing between the thin glass elements which improves uniformity in the appearance (e.g., coloration) of the mirror. This structural integrity results because the free-standing gel, the first glass element 112, and the second glass element 114, which individually have insufficient strength characteristics to work effectively in an electrochromic mirror, couple in such a manner that they no longer move independently but act as one thick unitary member. This stability includes, but is not limited to, resistance to, flexing, warping, bowing and breaking, as well as improved image quality of the reflected image, e.g., less distortion, double image, color uniformity and independent vibration of each glass element. However, while it is important to couple the front and rear glass elements, it is equally important (if not more so) to ensure that the electrochromic mirror functions properly. The free-standing gel must bond to the electrode layers (including the reflector/electrode if the mirror has a third surface reflector) on the walls of such a device, but not interfere with the electron transfer between the electrode layers and the electrochromic material(s) disposed in the chamber 116. Further, the gel must not shrink, craze or weep over time such that the gel itself causes poor image quality. Ensuring that the free-standing gel bonds well enough to the electrode layers to couple the front and rear glass elements and does not deteriorate over time, while allowing the electrochromic reactions to take place as though they were in solution is an important aspect of the present invention.

To perform adequately a mirror must accurately represent the reflected image, and this cannot be accomplished when the glass elements (to which the reflector is attached) tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel and a housing. Many mirrors also typically have a potting material as a secondary seal. Each of these components, materials and adhesives have varying coefficients of thermal expansion that will expand and shrink to varying degrees during heating and cooling and will exert stress on the glass elements 112 and 114. On very large mirrors hydrostatic pressure becomes a concern and may lead to double imaging problems when the front and rear glass elements bow out at the bottom and bow in at the top of the mirror. By coupling the front and rear glass elements the thin glass/free-standing gel/thin glass combination act as one thick unitary member (while still allowing proper operation of the electrochromic mirror) and thereby reduce or eliminate the bending, bowing, flexing, double image and distortion problems and non-uniform coloring of the electrochromic medium.

The cooperative interaction between the free-standing gel and the thin glass elements of the present invention also improves the safety aspects of the electrochromic mirror 110 having thin glass elements. In addition to being more flexible, thin glass is more prone to breakage than thick glass. By coupling the free-standing gel with the thin glass the overall strength is improved (as discussed above) and further restricts shattering and scattering and eases clean-up in the case of breakage of the device.

The improved cross-linked polymer matrix used in the present invention is disclosed in commonly assigned co-pending U.S. patent application Ser. No. 08/616,967 entitled "IMPROVED ELECTROCHROMIC LAYER AND DEVICES COMPRISING SAME" filed on Mar. 15, 1996, and the International Patent Application filed on or about Mar. 15, 1997 and claiming priority to this U.S. Patent Application. The entire disclosure of these two Applications, including the references contained therein, are hereby incorporated herein by reference.

Generally, the polymer matrix results from crosslinking polymer chains, where the polymer chains are formed by the vinyl polymerization of a monomer having the general formula:

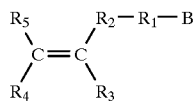

where $R_1$ is optional and may be selected from the group consisting of: alkyl, cycloalkyl, poly-cycloalkyl, heterocycloalkyl, carboxyl and alkyl and alkenyl derivatives thereof; alkenyl, cycloalkenyl, cycloalkadienyl, poly-cycloalkadienyl, aryl and alkyl and alkenyl derivatives thereof, hydroxyalkyl; hydroxyalkenyl; alkoxyalkyl; and alkoxyalkenyl where each of the compounds has from 1 to 20 carbon atoms. $R_2$ is optional and may be selected from the group consisting of: alkyl, cycloalkyl, alkoxyalkyl, carboxyl, phenyl and keto where each of the compounds has from 1–8 carbon atoms; and oxygen. $R_3$, $R_4$, and $R_5$ may be the same or different and may be selected from the group consisting of: hydrogen, alkyl, cycloalkyl, poly-cycloalkyl, heterocycloalkyl, and alkyl and alkenyl derivatives thereof; alkenyl, cycloalkenyl, cycloalkadienyl, poly-cycloalkadienyl, aryl and alkyl and alkenyl derivatives thereof; hydroxyalkyl; hydroxyalkenyl; alkoxyalkyl; alkoxyalkenyl; keto; acetoacetyl; vinyl ether and combinations thereof, where each of the compounds has from 1 to 8 carbon atoms. Finally, B may be selected from the group consisting of hydroxyl; cyanato; isocyanato; isothiocyanato; epoxide; silanes; ketenes; acetoacetyl, keto, carboxylate, imino, amine, aldehyde and vinyl ether. However, as will be understood by those skilled in the art, if B is an cyanato, isocyanato, isothiocyanato, or aldehyde it is generally preferred that $R_1$, $R_2$, $R_3$, $R_4$, and $R_5$ not have a hydroxyl functionality.

Preferred among the monomers is methyl methacrylate; methyl acrylate; isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate; 4-vinylphenol; acetoacetoxy methacrylate and acetoacetoxy acrylate.

Electrochromic devices are sensitive to impurities, which is shown through poor cycle life, residual color of the electrochromic material in its bleached state, and poor UV stability. Although many commercial precursors are fairly pure and perform adequately as ordered, purification would improve their performance. They can not, however, be readily purified by distillation because their low vapor pressure makes even vacuum distillation difficult or impossible. On the other hand, the monomers used to make the polymer matrix can be purified and thus are a significant advance in ensuring proper performance of an electrochromic device. This purification may be through chromatography, distillation, recrystalization or other purification techniques well known in the art.

The monomers of the preferred embodiment of the present invention should also preferably be capable of pre-polymerization, typically in the solvent utilized in the final electrochromic mirror. By pre-polymerization we mean that the monomers and/or precursors react with one another to produce relatively long and relatively linear polymers. These polymer chains will remain dissolved in the solvent and can have molecular weights ranging from about 1,000 to about 300,000, although those skilled in the art will understand that molecular weights of up to 3,000,000 are possible under certain conditions.

It should be understood that more than one monomer may be pre-polymerized together. Equation [1] shows the general formula for the monomers of the preferred embodiment of the present invention. Generally, any of the combinations of the monomers shown may be combined into one or more polymers (i.e., a polymer, a copolymer, terpolymer, etc.) in the pre-polymerization process. For example, one monomer may be polymerized to give a homogeneous polymer material such as poly(2-hydroxyethyl methacrylate), poly(2-isocyanatoethyl methacrylate), and the like. However, it is generally preferred that a species with a crosslinking reactive component (e.g., hydroxyl, acetoacetyl, isocyanate, thiol etc.) be combined with another species either having the same crosslinking reactive component or no crosslinking reactive component (e.g., methyl methacrylate, methyl acrylate, etc.). If a copolymer is produced, the ratio of the monomers without and with the crosslinking components may range from about 200:1 to about 1:200. An example of these copolymers include hydroxyethyl methacrylate (HEMA) combined with methyl methacrylate (MMA) to form a copolymer. The ratio of HEMA to MMA may range form about 1:3 to about 1:50 with the preferred ratio being about 1:10. The preferred crosslinker for any of the prepolymers having a hydroxyl (or any reactive group having an active hydrogen, such as thiol, hydroxyl, acetoacetyl, urea, melamine, urethane, etc.) is an isocyanate, isothiocyanate, and the like having a functionality greater than one. Also, 2-isocyanatoethyl methacrylate (IEMA) may be combined with MMA in the ratio of about 1:3 to about 1:50 with the preferred ratio of about 1:10. Crosslinking of any of the polymer chains containing an isocyanate can occur with any di- or poly-functional compound containing a reactive hydrogen, such as hydroxyl, thiol, acetoacetyl, urea, melamine, urethanes, with hydroxyl being presently preferred. These must have a functionality greater than one and may be the same as those described hereinabove, aliphatic or aromatic compounds or, preferably, may be 4,4'-isopropylidenediphenol, 4-4'(1-4 phenylenediisopropylidene) bisphenol, 4-4'(1-3 phenylenediisopropylidene), or bisphenol 1,3-dihydroxy benzene. Although the above description relates to copolymers, it will be understood by those skilled in the art that more complex structures (terpolymers, etc.) may be made using the same teachings.

Finally, two copolymers may be combined such that they crosslink with one another. For example HEMA/MMA may be combined with IEMA/MMA and the hydroxyl groups of HEMA will self-react with the isocyanate groups of IEMA to form an open polymeric structure. It should be understood that the rates of crosslinking for any of the polymers described herein can be controlled by proper selection of the reactive crosslinking species employed. For example, reaction rates can be increased by using an aromatic isocyanate or an aromatic alcohol or both. Reaction rates can be decreased, for example, by using sterically hindered isocyanates or sterically hindered alcohols or both.

It should also be noted that the rigidity of the free standing gel can be altered by changing the polymer molecular weight, the weight percent of the polymer and the crosslink density of the polymer matrix. The gel rigidity generally increases with increasing polymer concentration (weight percent), increasing crosslink density and to some extent with increasing molecular weight.

During operation, light rays enter through the front glass 112, the transparent conductive layer(s) 118, the free-standing gel and at least one electrochromic material in chamber 116, the transparent conductive layer 120 and the back glass 114, before being reflected from the reflector 124 provided on the fourth surface 114b of the mirror 110. Light in the reflected rays exit by the same general path traversed in the reverse direction. Both the entering rays and the reflected rays are attenuated in proportion to the degree to which the gelled electrochromic medium 124 is light absorbing. Alternatively, as stated above, the reflector may be placed on the third surface 114a in accordance with the disclosure of U.S. Patent Application entitled "ELECTROCHROMIC REARVIEW MIRROR INCORPORATING A THIRD SURFACE METAL REFLECTOR" filed on or about Apr. 2, 1997. The entire disclosure of this U.S. Patent Application is hereby incorporated herein by reference. In this case the third surface reflector doubles as an electrode and the transparent conductive layer 120 may optionally be deleted. Further, if the reflector is placed on the third surface 114a, a heater 138 may be placed on the fourth surface 114b in accordance with the teachings in the immediately above-referenced U.S. Patent Application.

The at least one electrochromic material may be a wide variety of materials capable of changing properties such that light traveling therethrough is attenuated but must be capable of being dissolved in the solvent. In order to balance charge during the electrochromic reactions, another redox active material must be present. This other material may include solution-phase redox, solid-state, and metal or viologen salt deposition; however, solution phase redox is presently preferred, such as those disclosed in above-referenced U.S. Pat. Nos. 4,902,108; 5,128,799, 5,278,693; 5,280,380; 5,282,077; 5,294,376; 5,336,448.

One or more layers of a transparent electrically conductive material 118 are deposited on the second surface 112b to act as an electrode. Transparent conductive material 118 may be any material which: bonds well to front element 112 and maintains this bond when the epoxy seal 122 bonds thereto; is resistant to corrosion with any materials within the electrochromic device; is resistant to corrosion by the atmosphere; and has minimal diffuse or specular reflectance, high light transmission, neutral coloration and good electrical conductance. Transparent conductive material 118 may be fluorine doped tin oxide, tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany, and the materials described in above-referenced U.S. Pat. No. 5,202,787, such as TEC 20 or TEC 15, available from Libbey Owens-Ford Co. (LOF) of Toledo, Ohio. Similar requirements are needed for whatever is deposited onto the third surface 114a, whether it is another layer of transparent conductive material 120 or a combined reflector/electrode.

The conductance of transparent conductive material 118 will depend on its thickness and composition, but as a general rule atmospheric pressure chemical vapor deposition (APCVD) applied coatings, such as TEC coatings from LOF, are cheaper than vacuum-deposited coatings, such as ITO coatings, and more importantly they are more color-neutral. This color neutrality of the coatings is especially pronounced when the mirrors are in their full colored or darkened state because in this dark state the primary sources of the reflection viewed by a vehicle occupant are the reflections from the first and second surface of the device. Thus, the transparent coating 118 disposed on the second surface 112b has a greater influence on the color neutrality of the device when the device is in a highly or full darkened state. Another factor to be considered is that, although both ITO and the TEC coatings will work as transparent conductors in mirrors having thick glass elements, the TEC coatings cannot to date be applied onto glass having a thickness less than about 2 mm while the glass is on the production float-line used to manufacture sheets of glass. Thus, TEC coatings are not presently available on thin glass. This leads to color matching problems because there are cases where it is beneficial to have an interior mirror with low cost thick glass elements and an exterior mirror with light weight thin glass elements and have both mirrors on the same vehicle. The inside mirror (110 in FIG. 1) having thick glass can use the inexpensive TEC coatings on the second surface and therefore, when the mirror is in the darkened state, the reflected image is color-neutral. However, the outside mirrors (111a and/or 111b of FIG. 1) having thin glass must use the expensive ITO coatings on the second surface and therefore, when the mirror is in the darkened state, the reflected image is not completely color-neutral—and therefore not color-matched with the inside mirror.

In addition, TEC coatings can cause difficulties when applied to glass that must then be bent or curved to a convex or aspheric shape, irrespective of the thickness of the glass, because each glass element must have a substantially similar radius of curvature. The TEC coatings are applied during the manufacture of the glass to the side of the glass that is not in contact with the tin bath or the rollers (i.e., the deposition is on the "clean" side of the glass). Since the glass bending process occurs after the glass is produced, the TEC coatings are present on the glass surface when the glass is bent. During the bending process the glass element is heated to high temperatures, and although not knowing the exact mechanism, it is believed that the difference in the coefficient of thermal expansion between the glass and the conductive coating, and/or the difference in emissivity between the coated and uncoated sides of the glass, tend to alter the flexing properties of the combined glass/coating structure during cooling. If a mirror with a fourth surface reflector is produced, then the TEC coatings will be placed on the second (concave) and third (convex) surfaces, and because of the altered flexing properties, each glass element will have a different radius of curvature. If a mirror with a third surface reflector is produced, two problems occur. First, to get similar radii of curvature, a TEC coating must be placed on the second and fourth surfaces, but the fourth surface TEC coating is essentially useless and does nothing but increase the unit price of the mirror. Second, the reflector/electrode that is applied to the third surface has to be applied to the "dirty" side of the glass that was in contact with the tin bath and the rollers. This leads to problems well known in the art such as tin bloom, sulfur stain and roller marks, all of which cause adverse side effects in electrochromic mirrors. ITO coatings can be applied to the second surface after the glass is bent to alleviate these problems, however, this leads to the same color-neutrality and color-matching problems outlined above.

In accordance with another aspect of the present invention, a multilayer color-neutral transparent conductive coating 118 can be used on the second surface of an exterior mirror (111a and/or 111b of FIG. 1) having thin or bent glass, in combination with an interior mirror having TEC coatings on the second surface such that the mirror-system is color-neutral and color-matched. This color-neutral transparent conductive coating includes a thin (e.g., between about 150 angstroms and about 500 angstroms) first transparent layer 118a having a high refractive index, followed by thin (e.g., between about 150 angstroms and about 500 angstroms) second transparent layer 118b having a low refractive index, followed by a thick (e.g., between about 800 angstroms and about 3500 angstroms) third conductive transparent layer 118c having a high refractive index. Glass has a refractive index of about 1.5; the first two thin layers generally having refractive indices of about 2.0 and about 1.5, respectively, tend to act in concert to form one layer having a medium refractive index of about 1.75. The thick top coating has a refractive index of about 2.0. Thus a stack is produced having refractive indices of approximately 1.5/1.75/2.0. The presently preferred compositions and thicknesses for each layer of the multilayer stack are: about 200–400 angstroms of ITO for the first layer 118a; about 200–400 angstroms of $SiO_2$ for the second layer 118b and about 1500 angstroms of ITO for the third layer 118c. This gradation between low and high refractive indices produces a transparent conductive coating that is color-neutral, which matches the color-neutral TEC coatings on the second surface of the inside mirror-leaving an inside/outside color-matched mirror system.

In accordance with yet another embodiment of the present invention, an additional advantage of thin glass construction is improved optical image quality for convex, aspheric and all electrochromic mirrors that are not flat. It is difficult to reproducibly bend glass and obtain identical local and global radii of curvature for each pair of glass elements. However, most electrochromic mirrors are made by bonding two glass elements together in a nominally parallel, planar, spaced-apart relationship and any deviation from parallelism manifests itself as distortion, double image and non-uniform spacing between the two glass elements. The double image phenomena is due to mismatch in the curvature of the glass elements which results in misalignment between the residual and secondary reflections from the front glass element and its transparent conducting coating and the reflections from the main reflector layer. This is extensively discussed in above-referenced U.S. Patent Application entitled "ELECTROCHROMIC REARVIEW MIRROR INCORPORATING A THIRD SURFACE METAL REFLECTOR". Changing the reflector layer from the fourth surface to the third surface helps reduce double imaging because the distance between the first surface, residual reflectance, and the reflectance form the main reflector is reduced. This is especially beneficial for mirrors using bent glass. Combining the use of a third surface reflector layer with the use of a thin glass front element provides a remarkable advantage for mirrors using bent glass since the residual and the main reflections are so close there is little or no double image. This is the case even when the glass is bent in normal bending processes that give rise to significant variations in the local and overall radius of curvature between the two glass elements used to make the mirror. The combination of a third surface reflector/electrode and thin glass front element provides a mirror that nearly equals the optical image quality of a true first surface reflector mirror even when the glass is bent.

The coating 120 of the third surface 114a is sealably bonded to the coating 118 on the second surface 112b near their outer perimeters by a sealing member 122. Preferably, sealing member 122 contains glass beads (not shown) to hold transparent elements 112 and 114 in a parallel and spaced apart relationship while the seal material cures. Sealing member 122 may be any material which is capable of adhesively bonding the coatings on the second surface 112b to the coatings on the third surface 114a to seal the perimeter such that electrochromic material 124 does not leak from chamber 116 while simultaneously maintaining a generally constant distance therebetween. Optionally, the layer of transparent conductive coating 118 and the layer on the third surface 120 (transparent conductive material or reflector/electrode) may be removed over a portion where sealing member is disposed (not the entire portion, otherwise the drive potential could not be applied to the two coatings). In such a case, sealing member 118 must bond well to glass.

The performance requirements for a perimeter seal member 122 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting or UV curing organic sealing resins are preferred. Such organic resin sealing systems for LCD's are described in U.S. Pat. Nos. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 122 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25 and V-40 polyamides from Shell Chemical Co.; "AJICURE" PN-23, PN-34 and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 352, CG, CG-325 and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, EH-5 available from Cabot Corporation, Tuscola, Ill. "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable silane coupling agents to improve the seal's hydrolytic stability are Z-6020, Z-6030, Z-6032, Z-6040, Z-6075 and Z-6076 available from Dow Corning Corporation, Midland, Mich. Suitable precision glass micro-bead spacers are available in an assortment of sizes from Duke Scientific, Palo Alto, Calif.

In the assembly and manufacture of electrochromic devices polymeric beads may be applied to the electrochromic mirror area on the viewing area of the second or third surface, i.e., inboard of the perimeter seal, to temporarily maintain proper cell spacing during the manufacturing process. These beads are even more useful with devices having thin glass elements because they help prevent distortion and double image during device manufacture and maintain a uniform electrochromic medium thickness until gellation occurs. It is desirable that these beads comprise a material that will dissolve in the electrochromic medium and is benign to the electrochromic system while being compatible with whatever electrochromic system is contained within the chamber 116 (e.g., the constituents of gelled layer 124). While the use of PMMA beads is known, they are not preferred because they have the following disadvantages: they require a heat cycle (generally at least 2 hours at 85 degrees C) to dissolve, they do not dissolve before the preferred gels of the present invention crosslink, they can cause light refracting imperfections in gelled and non-gelled electrochromic devices, and they can cause the electrochromic medium to color and clear more slowly near the area where beads were prior to dissolving.

In accordance with another aspect of the present invention, polymeric beads 117, that dissolve within an electrochromic device at ambient or near-ambient temperatures without imparting refractive imperfections, are placed or sprinkled on the second or third surface within the viewing area of the mirror or a window so that they prevent distortion and maintain cell spacing during manufacturing and dissolve very soon thereafter.

The polymeric beads 117 can be incorporated into an electrochromic mirror as follows: The perimeter sealing resin is charged with glass beads of the appropriate size desired for the final cell gap (typically around 135 microns in diameter for a solution-phase inside electrochromic mirror) at a level of about ½ weight percent. Dry polymeric beads 117 that are sized about 10% larger than the glass beads are loaded into a "salt shaker" type container with holes on one end. The rear glass element 114 is laid flat with the inside electrode surface (third surface) facing up. Plastic beads are sprinkled onto the coating (120) disposed on the third surface 114a using the salt shaker to a concentration of about 5 to 10 beads per square centimeter. The perimeter sealing member 122 is applied around the edges of the surface of the transparent conductive electrode on the rear surface of the front element 112 by dispensing or silk screening as is typical for the manufacture of LCD's, such that seal material covers the entire perimeter except for a gap of about 2 mm along one edge. This gap in the seal will be used as a fill port (not shown) to introduce the electrochromic medium after assembly of the glass plates and curing of the seal. After seal application, the glass plates are assembled together by laying the first glass plate on top of the second glass plate and the assembly is pressed until the gap between the glass plates is determined by the glass and plastic spacers. The sealing member 122 is then cured. The electrochromic cell is then placed fill port down in an empty container or trough in a vacuum vessel and evacuated. Electrochromic fluid media is introduced into the trough or container such that the fill port is submerged. The vacuum vessel is then backfilled which forces the fluid electrochromic material through the fill port and into the chamber 116. The fill port is then plugged with an adhesive, typically a UV light curing adhesive, and the plug material is cured. This vacuum filling and plugging process is commonly used in the LCD industry. If the proper polymeric bead material 117 is used, the beads will dissolve in the electrochromic medium without leaving a trace at room temperature or by applying moderate heat as the electrochromic medium gels thereby permanently fixing the cell gap.

Generally, these polymeric beads comprise a material that will readily dissolve in organic solvents, such as, for example, propylene carbonate, at ambient or near-ambient temperatures. The materials should dissolve in the electrochromic medium either within the time it takes the free-standing gel to crosslink (which generally takes around 24 hours), but not so fast that they do not provide a spacer function during processing (e.g., sealing and vacuum backfilling) of the mirror element. Materials that meet the above requirements include the following copolymers available from ICI Acrylics, Wilmington, Del.: "ELVACITE" 2008, a MMA/methacrylic acid copolymer, "ELVACITE" 2010, a MMA/ethylacrylate copolymer, "ELVACITE" 2013, and a MMA/n-butylacrylate copolymer, as well as poly (propylene carbonate), with "ELVACITE" 2013 being presently preferred. In addition to these copolymers, it is believed that materials such as various polyacrylates and polyethers may be suitable for the dissolvable beads.

Since the beads are used to maintain cell spacing for a short time during manufacture, they should preferably have a diameter equal to or slightly larger than the cell spacing of the device, which can be accomplished by sieving through successive screens to obtain the desired size. Sieves of the appropriate size can be purchased from ATM, Milwaukee, Wis. If 135 micron glass beads will be loaded into the sealing resin, the preferred plastic bead size would be about 10% larger or 148 microns. To sieve plastic beads to the 148 micron range, a standard 145 micron and a standard 150 micron sieve would be required. If a tighter range is desired, custom-sized sieves could be ordered for an additional cost. The 150 micron sieve is placed on top of the 145 micron sieve and the top 150 micron sieve is charged with unsized plastic beads. The sieves are then vibrated such that beads smaller than 150 microns will fall through the holes in the 150 micron sieve. Beads smaller than 145 microns will fall through the bottom 145 micron sieve, and beads between 145 and 150 microns in size will be captured between the 145 micron and the 150 micron sieves. If the beads tend to clump or stick together, effective separation can be achieved by flushing a liquid such as water through the sieve stack while vibrating the sieves. Beads wet-sieved in this manner must be thoroughly dried before use such as by oven baking at 80° C. for 2 hours.

The following illustrative examples are not intended to limit the scope of this invention but to illustrate its application and use:

EXAMPLE 1

Several electrochromic mirrors containing a free-standing gel were prepared as follows. A solution of 1.5114 grams of bis(1,1'-3-phenylpropyl)-4,4'-dipyridinium bis (tetrafluoroborate) in 37.02 grams of a copolymer of 1:10 isocyanate ethyl methacrylate/methyl methacrylate was mixed with a solution comprising 0.7396 grams of Bisphenol A, 0.4606 grams of 5,10-dimethyl-5,10-dihydrophenazine, 0.5218 grams of Tinuvin P (Ciba Geigy, Tarrytown, N.Y.) in 57.36 grams of propylene carbonate. This mixture was vacuum backfilled into several individual mirrors having two 1.1 mm glass elements that were sealed together with an epoxy seal, with a 180 micron cell spacing, that contained polymeric spacer beads comprising poly (propylene carbonate), available from Sigma-Aldrich, "ELVACITE" 2008, 2010, 2013, and 2041, respectively. The gel formation was carried out at ambient temperatures (20–25 degrees Celsius). The mirrors were approximately 4"×6" and were subjected to a vibration test consisting of a five hundred G-applied shock load with a 6 point random axis of rotation, with temperatures cycling repetitively from −100 degrees Celsius to 100 degrees Celsius over a four minute ramp for a total of 25 cycles. These mirrors all showed excellent vibrational resistance. Additionally, all of the spacer beads dissolved within 24 hours from when the mirrors were filled with the gel mixture.

EXAMPLE 2

Several electrochromic mirrors were prepared in accordance with Example 1, except the size of the mirror elements were approximately 5"×9". All of the spacer beads dissolved within 24 hours from when the mirrors were filled with the gel mixture. These mirrors were subjected to a pressure point resistance test. These parts, having significant area, have inherent points at which they are more susceptible to breakage under externally applied pressure. One of these points (approximately 0.5 inches form the edge) was selected for testing. These parts showed no breakage even at 1235 pounds, which represents the maximum attainable pressure on the testing equipment used (a Chattilon Force Measurement Gauge ET-110, with a rounded hard plastic finger of 1' diameter). Upon releasing the 1235 pounds of pressure, it was noted that, due to the extreme pressure, the gel had been forced out from an area approximately 0.5 inches in diameter immediately under the plastic test finger. The glass elements appeared to have contacted one another as well. Within moments after removing the external pressure, the gel "self-healed" and resumed its original position at the test point. For comparison, parts containing no free-standing gel and having glass elements with thicknesses of about 1.1 mm and PMMA beads showed glass breakage at an average of 167 pounds.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic variable reflectance mirror for motor vehicles, comprising:

front and rear spaced elements, each having front and rear surfaces and each having a thickness ranging from about 0.5 mm to about 1.5 mm;

a layer of transparent conductive material disposed on said rear surface of said front element;

a reflector disposed on one side of said rear element provided that, if said reflector is on said rear surface of said rear element, then said front surface of said rear element contains a layer of a transparent conductive material; and a perimeter sealing member bonding together said front and rear spaced elements in a spaced-apart relationship to define a chamber therebetween, where said chamber contains a free-standing gel comprising a solvent and a crosslinked polymer matrix, and where said chamber further contains at least one electrochromic material;

where said polymer matrix cooperatively interacts with said front and rear elements, and where said reflector is effective to reflect light through said chamber and said front element when said light reaches said reflector after passing through said front element and said chamber.

2. The electrochromic mirror of claim 1, where said at least one electrochromic material is in solution with said solvent and, as part of said solution, interspersed in said crosslinked polymer matrix.

3. The electrochromic mirror of claim 1, where said front and rear spaced elements each have a thickness ranging from about 0.8 mm to about 1.2 mm.

4. The electrochromic mirror of claim 1, where said front and rear spaced elements each have a thickness of about 1.0 mm.

5. The electrochromic mirror of claim 1, where said polymer matrix results from crosslinking polymer chains and where said polymer chains are formed by polymerizing at least one monomer selected from the group consisting of: methyl methacrylate; methyl acrylate; 2-isocyanatoethyl methacrylate; 2-isocyanatoethyl acrylate; 2-hydroxyethyl methacrylate; 2-hydroxyethyl acrylate; 3-hydroxypropyl methacrylate; vinyl ether n-butyl methyl methacrylate; tetraethylene glycol vinyl ether; glycidyl methacrylate; 4-vinylphenol; acetoacetoxyethyl methacrylate and acetoacetoxyethyl acrylate.

6. The electrochromic mirror according to claim 5, where said polymer chains are cross-linked by reaction with a compound having a functional group selected from the group consisting of aromatic and aliphatic hydroxyl; aromatic and aliphatic cyanato; aromatic and aliphatic isocyanato; aliphatic and aromatic isothiocyanato, with a functionality of at least 2.

7. The electrochromic mirror according to claim 5 where said polymer chains results from the polymerization of at least two distinct monomers.

8. The electrochromic mirror according to claim 7 where said at least two monomers are selected from the group consisting of: methyl methacrylate; methyl acrylate; 2-isocyanatoethyl methacrylate; 2-isocyanatoethyl acrylate; 2-hydroxyethyl methacrylate; 2-hydroxyethyl acrylate; 3-hydroxypropyl methacrylate; vinyl ether n-butyl methyl methacrylate; tetraethylene glycol divinyl ether; glycidyl methacrylate; 4-vinylphenol; acetoacetoxyethyl methacrylate and acetoacetoxyethyl acrylate.

9. The electrochromic mirror according to claim 8, where said at least two monomers are selected from the group consisting of: methyl methacrylate; 2-isocyanatoethyl methacrylate; 2-hydroxyethyl methacrylate; and glycidyl methacrylate.

10. The electrochromic mirror according to claim 9 where said at least two monomers comprise 2-hydroxyethyl methacrylate and methyl methacrylate.

11. The electrochromic mirror according to claim 10 where the ratio of 2-hydroxyethyl methacrylate to methyl methacrylate is about 1:10.

12. The electrochromic mirror according to claim 10 where said polymer chains formed from at least 2-hydroxyethyl methacrylate and methyl methacrylate are crosslinked by a compound having more than one functional group that will react with an active hydrogen.

13. The electrochromic mirror according to claim 9 where said at least two monomers comprise isocyanatoethyl methacrylate and methyl methacrylate.

14. The electrochromic mirror according to claim 13 where the ratio of isocyanatoethyl methacrylate to methyl methacrylate ranges from about 1:3 to about 1:50.

15. The electrochromic mirror according to claim 14 where the ratio of isocyanatoethyl methacrylate to methyl methacrylate is about 1:20.

16. The electrochromic mirror according to claim 14 where said polymer chains formed from at least isocyanatoethyl methacrylate and methyl methacrylate are crosslinked by a compound having a functional group containing more than one active hydrogen.

17. The electrochromic mirror according to claim 5, where said polymer matrix is formed from at least two distinct polymer chains, each of said at least two distinct polymer chains comprise at least one monomer selected from the group consisting of methyl methacrylate and methyl acrylate polymerized with at least one monomer selected from the group consisting of 2-isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate; 4-vinylphenol; acetoacetoxyethyl methacrylate; vinyl ether n-butyl methyl methacrylate and acetoacetoxyethyl acrylate, where said first and second polymer chains may be the same or different.

18. The electrochromic mirror according to claim 17 where said first of said at least two polymer chains comprises a copolymer of isocyanatoethyl methacrylate and methyl methacrylate and where said second of said at least two polymer chains comprises a copolymer of 2-hydroxyethyl methacrylate and methyl methacrylate.

19. The electrochromic mirror according to claim 18 where the ratio of isocyanatoethyl methacrylate and methyl methacrylate ranges from about 1:3 to about 1:50 and where the ratio of 2-hydroxyethyl methacrylate and methyl methacrylate ranges from about 1:3 to about 1:50.

20. The electrochromic mirror according to claim 1, where said cooperative interaction between said free standing gel and said front and rear elements makes said mirror resistant to bending and breaking.

21. The electrochromic mirror according to claim 1, further comprising polymeric beads disposed within said chamber.

22. The electrochromic mirror according to claim 21, where said beads comprise a material that will dissolve within an electrochromic device at ambient or near-ambient temperatures within about 24 hours.

23. The electrochromic mirror according to claim 22, where said beads comprise a copolymer selected from the group consisting of: MMA/methacrylic acid, MMA/ethylacrylate, MMA/n-butylacrylate, and poly(propylene carbonate).

24. The electrochromic mirror according to claim 22, where said beads do not impart any refractive imperfections to said mirror.

25. The electrochromic mirror according to claim 1, where said layer of transparent conductive material disposed on said rear surface of said front element is a multi-layer stack having a first layer with a high refractive index, a second layer with a low refractive index and a third layer with a high refractive index.

26. The electrochromic mirror according to claim 25, where said first layer comprises ITO and has a thickness between about 200 angstroms and about 400 angstroms, said second layer comprises $SiO_2$ and has a thickness of between about 200 angstroms and about 400 angstroms, and said third layer comprises ITO and has a thickness of about 1500 angstroms.

27. An electrochromic variable reflectance mirror for motor vehicles, comprising:

bent front and rear spaced elements, each having front and rear surfaces, a layer of transparent conductive material disposed on said rear surface of said front element, a reflector disposed on said front side of said rear element, and a perimeter sealing member bonding together said front and rear spaced elements in a spaced-apart relationship to define a chamber therebetween, where said chamber contains a free-standing gel comprising a solvent and a crosslinked polymer matrix, and where said chamber further contains at least one electrochromic material in solution with said solvent and, as part of said solution, interspersed in said crosslinked polymer matrix, and where said polymer matrix cooperatively interacts with said front and rear elements, and where said reflector material is effective to reflect light through said chamber and said front element when said light reaches said reflector after passing through said front element and said chamber.

28. The electrochromic mirror of claim 27, where said front and rear spaced elements are bent to a convex shape.

29. The electrochromic mirror of claim 27, where said front and rear spaced elements are bent to an aspheric shape.

* * * * *

UNITED STATES PATENT AND TRADEMARK OFFICE
CERTIFICATE OF CORRECTION

PATENT NO. : 5,940,201
DATED : August 17, 1999
INVENTOR(S) : Kevin L. Ash, William L. Tonar, Frederick T. Bauer It is certified that error appears in the above-identified patent and that said Letters Patent is hereby corrected as shown below: ON THE TITLE PAGE:

"Kevin L. Ash, Grand Rapids; William L. Tonar; Frederick T. Bauer, both of Holland, all of Mich." should be -- Kevin L. Ash, Grand Rapids; William L. Tonar; Frederick T. Bauer, both of Holland, Kathy E. Roberts, East Grand Rapids, all of Mich.-- .

Signed and Sealed this

Thirteenth Day of June, 2000

*Attest:*

Q. TODD DICKINSON

*Attesting Officer*   *Director of Patents and Trademarks*